United States Patent
Juncker et al.

(10) Patent No.: US 7,543,064 B2
(45) Date of Patent: Jun. 2, 2009

(54) MULTIPLAYER PEER-TO-PEER CONNECTION ACROSS FIREWALLS AND NETWORK ADDRESS TRANSLATORS USING A SINGLE LOCAL PORT ON THE LOCAL HOST

(75) Inventors: Christophe Juncker, Los Gatos, CA (US); Nanda Kutty, Union City, CA (US)

(73) Assignee: Logitech Europe S.A. (CH)

( * ) Notice: Subject to any disclaimer, the term of this patent is extended or adjusted under 35 U.S.C. 154(b) by 924 days.

(21) Appl. No.: 10/957,122

(22) Filed: Sep. 30, 2004

(65) Prior Publication Data

US 2006/0075127 A1 Apr. 6, 2006

(51) Int. Cl.
*G06F 15/16* (2006.01)
(52) U.S. Cl. ...................................... 709/227
(58) Field of Classification Search ................. 709/227, 709/228, 229; 726/3, 11
See application file for complete search history.

(56) References Cited

U.S. PATENT DOCUMENTS 7,272,650 B2 * 9/2007 Elgebaly et al. ............. 709/227
7,302,496 B1 * 11/2007 Metzger ..................... 709/245
7,328,280 B2 * 2/2008 Takeda et al. ............... 709/245

FOREIGN PATENT DOCUMENTS

WO   WO 2004/064356 A2   7/2004

OTHER PUBLICATIONS

Rosenberg et al., "STUN - Simple Traversal of User Datagram Protocol (UDP) Through Network Address Translators (NATs)." Network Working Group, RFC 3489, p. 1-47, Mar. 2003.

* cited by examiner

*Primary Examiner*—William C Vaughn, Jr.
*Assistant Examiner*—Yemane Mesfin
(74) *Attorney, Agent, or Firm*—Townsend and Townsend and Crew LLP

(57) ABSTRACT

Embodiments of the invention achieve a very high success rate in multilayer peer-to-peer connection across firewalls and network address translators (NATs) using a single port on the local host. In one embodiment, a system of providing peer-to-peer connection comprises a plurality of host devices disposed behind corresponding NATs; and a plurality of STUN servers. Each host device includes a first socket bound to a first private port and a second socket bound to a second private port. Each host device sends a first STUN packet through the first socket to a first STUN server and a second group of STUN packets through the second socket to the STUN servers via public ports of the corresponding NAT. The STUN servers identify the public port numbers of the public ports. Each host device is configured to calculate a predicted public port number of the corresponding NAT for the second socket, based on the public port numbers of the public ports for the first socket and the second socket, the predicted public port number to be used for peer-to-peer connection between the second socket of the host device and other host devices.

22 Claims, 7 Drawing Sheets

MULTIPLAYER PEER-TO-PEER CONNECTION ACROSS FIREWALLS AND NETWORK ADDRESS TRANSLATORS USING A SINGLE LOCAL PORT ON THE LOCAL HOST

CROSS-REFERENCES TO RELATED APPLICATIONS

Not applicable.

BACKGROUND OF THE INVENTION

The present application relates generally to communications between computer devices and, more particularly, to multiplayer peer-to-peer connections across firewalls and network address translators (NATs), using a single port number on each computer device.

More and more applications attempt to create a peer-to-peer connection between two hosts to transfer data. However, it is non-trivial to achieve such a connection in case one or both of the hosts are behind a firewall, especially if it also does network address translation, as is the case with the great majority of business and home firewalls nowadays. For home use, people often use a device that is a combination of a router, firewall and NAT. The problem is even further complicated in the case where a host attempts multiple peer-to-peer connections at the same time through a single port. This is exactly the way in which many PC and console games doing peer-to-peer data exchange work.

An additional challenge is to be able to set up a new connection through a single (private) port of the host, all the while transferring data through that same port with other hosts. This is a situation commonly found in network games where people meet in a lobby, and where as soon as a new user joins, he or she can start talking to the other users through voice chat using a headset.

Currently most peer-to-peer applications only have basic support for firewall/NAT traversal. The result is that if a host happens to be behind a difficult to traverse firewall/NAT, the host's online experience will be poor because a lot of connections will fail.

One solution game publishers have used is to instruct gamers to do port forwarding on their firewalls/NATs. However, this is a complicated operation for the average user and potentially creates a security hole in the firewall. Furthermore, this solution fails when two users are behind the same firewall.

Another solution adopted by Microsoft® in the XBox™ gaming console is to display on the support site a list of compatible and incompatible router devices. Indeed, some firewalls are more difficult to traverse than others, and in the case of Microsoft® the technology will enable peer-to-peer connectivity between hosts behind "easy" firewalls/NATs, but not behind more difficult ones. But often users already have a firewall before they buy a game. In case they use a firewall that is not supported by the game, they will run into problems to play online.

BRIEF SUMMARY OF THE INVENTION

Embodiments of the present invention provide a method and a system for achieving a very high success rate (close to 100%) in peer-to-peer connection establishment. It does so for single or multiple connections, using a single port or multiple random ports, and it works with any combination of any types of firewalls/NATs, regardless of whether they are easy or difficult to traverse. It also enables hosts to connect to a group of already interconnected hosts at any time, even when using a single port of a host and while the other hosts are already exchanging data with that host on that same port. Embodiments of the present invention rely on STUN servers (RFC 3489) to find out about the public IP address and port used by the NAT, and the exact type of the NAT.

An aspect of the present invention is directed to a method of providing peer-to-peer connection among a plurality of host devices disposed behind corresponding network address translators. The method comprises providing a plurality of STUN servers; for each host device to be connected, providing a first socket bound to a first private port and a second socket bound to a second private port; for each host device to be connected, sending a first STUN packet through the first socket to a first STUN server of the plurality of STUN servers via a public port of the corresponding network address translator, the public port having a public port number identified by the first STUN server; for each host device to be connected, sending a second group of STUN packets through the second socket to the plurality of STUN servers via one or more public ports of the corresponding network address translator, the second group of STUN packets being equal in number to the STUN servers, the one or more public ports being different from the public port for the first socket, each of the one or more public ports having a public port number identified by the STUN servers; and for each host device to be connected, calculating a predicted public port number of the corresponding network address translator for the second socket, based on the public port numbers of the public ports for the first socket and the second socket, the predicted public port number to be used for peer-to-peer connection between the second socket of the host device and other host devices.

In some embodiments, the predicted public port number of the corresponding network address translator for the second socket of the host device is a maximum of ((the port number of the public port for the first socket+an increment) and (the port number of the last public port which is the highest port number for the second socket+an increment)). Different public port numbers of the corresponding network address translator are separated by an increment. The predicted public port number of the corresponding network address translator for the second socket of the host device is (the port number of the public port for the first socket+the increment), if there has been a previous peer-to-peer connection for the second socket of the host device via the one or more public ports of the corresponding network address translator and the one or more public ports are still active. The predicted public port number of the corresponding network address translator for the second socket of the host device is (the port number of the last public port which is the highest port number for the second socket+the increment), if either there has not been a previous peer-to-peer connection for the second socket of the host device via the one or more public ports of the corresponding network address translator, or there has been a previous peer-to-peer connection for the second socket of the host device via the one or more public ports of the corresponding network address translator and the peer-to-peer connection has expired and the one or more public ports are no longer active.

In specific embodiments, the method further comprises forming a peer-to-peer connection between the second socket of a first host device and the second socket of a second host device using the predicted public port number of the corresponding network address translator for each of the second socket of the first host device and the second socket of the second host device; and forming a peer-to-peer connection between the second socket of the first host device and the second socket of a third host device using the predicted public port number of the corresponding network address translator for the second socket of the third host device and an updated public port number of the corresponding network address translator for the second socket of the first host device. The updated public port number of the corresponding network address translator for the first host device is obtained by repeating the steps of sending a first STUN packet, sending a second group of STUN packets, and calculating the predicted public port number as the updated public port number of the corresponding network address translator for the second socket of the first host device to be connected to the second socket of the third host device.

In some embodiments, the method further comprises sending a packet from the second socket of a first host device to the second socket of a second host device using the predicted public port number of the corresponding network address translator for each of the second socket of the first host device and the second socket of the second host device. The corresponding network address translator of the first host device is a cone network address translator and the corresponding network address translator of the second host device is a symmetric network address translator. The method further comprises, if there is a previous successful connection between the second socket of the first host device and the second socket of the second host device via a previous public port number of the corresponding network address locator of the second host device, sending a duplicate of the packet from the second socket of the first host device to the second socket of the second host device via the previous public port number of the corresponding network address locator of the second host device. The method further comprises storing, by a first host device in a buffer, information of public port number of a corresponding network address locator of another host device if there is a previous successful connection between the second socket of the first host device and the second socket of the other host device.

In specific embodiments of the invention, the method further comprises forming a peer-to-peer connection between the second socket of a first host device and the second socket of a second host device using the predicted public port number of the corresponding network address translator for each of the second socket of the first host device and the second socket of the second host device, the first host device and the second host device communicating in a main loop of an application; and forming a peer-to-peer connection between the second socket of the first host device and the second socket of a third host device using a separate thread from the main loop of the application to transfer STUN packets with the STUN servers and to transfer connection packets with the third host device. The method further comprises checking incoming packets on the second socket of the first host device in the main loop of the application to determine whether the incoming packet is a STUN packet, a connection packet, or other data; and if the incoming packet is a STUN packet or a connection packet, moving the incoming packet to a shared buffer to be shared with the separate thread used for forming the peer-to-peer connection between the second socket of the first host device and the second socket of the third host device.

In accordance with another aspect of the invention, a system of providing peer-to-peer connection among a plurality of host devices comprises a plurality of host devices disposed behind corresponding network address translators; and a plurality of STUN servers. Each host device includes a first socket bound to a first private port and a second socket bound to a second private port. Each host device is configured to send a first STUN packet through the first socket to a first STUN server of the plurality of STUN servers via a public port of the corresponding network address translator. The public port has a public port number identified by the first STUN server. Each host device is configured to send a second group of STUN packets through the second socket to the plurality of STUN servers via one or more public ports of the corresponding network address translator. The second group of STUN packets are equal in number to the STUN servers. The one or more public ports are different from the public port for the first socket. Each of the one or more public ports has a public port number identified by the STUN servers. Each host device is configured to calculate a predicted public port number of the corresponding network address translator for the second socket, based on the public port numbers of the public ports for the first socket and the second socket, the predicted public port number to be used for peer-to-peer connection between the second socket of the host device and other host devices.

DETAILED DESCRIPTION OF THE INVENTION

Figure 1:
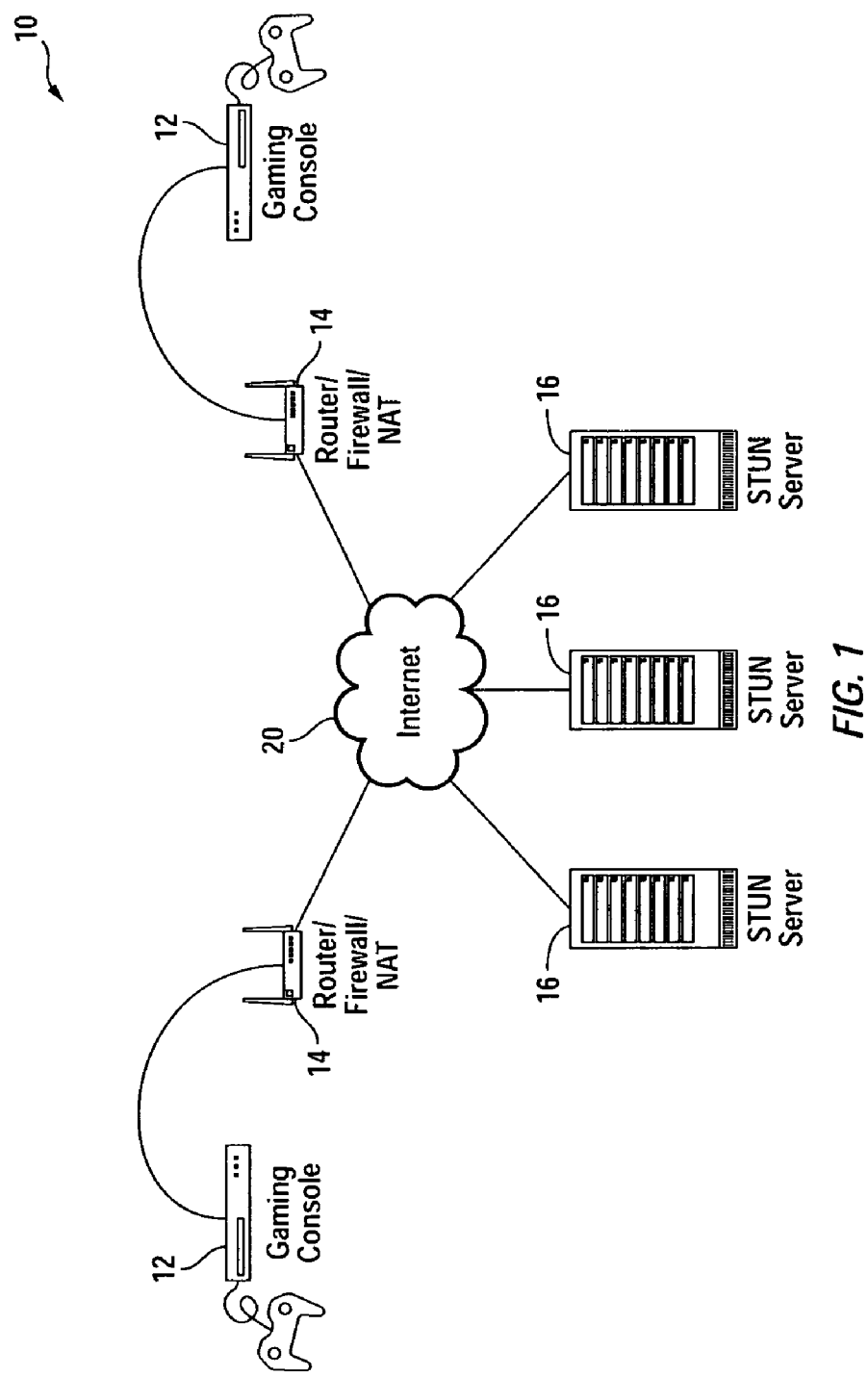
FIG. 1 is a diagram showing a typical setup of two hosts connected behind a NAT and communication with STUN servers.

As shown in the typical setup 10 of FIG. 1, two hosts 12 (e.g., game consoles) are connected each behind a NAT 14 (or a device that is a combination of a router, a firewall, and a NAT) and communicate with STUN servers 16 via a network 20 (e.g., the Internet). When attempting to exchange packets peer-to-peer, the host 12 may either use a random port number every time it attempts a connection, or it may use a predefined unique port number.

Figure 2:
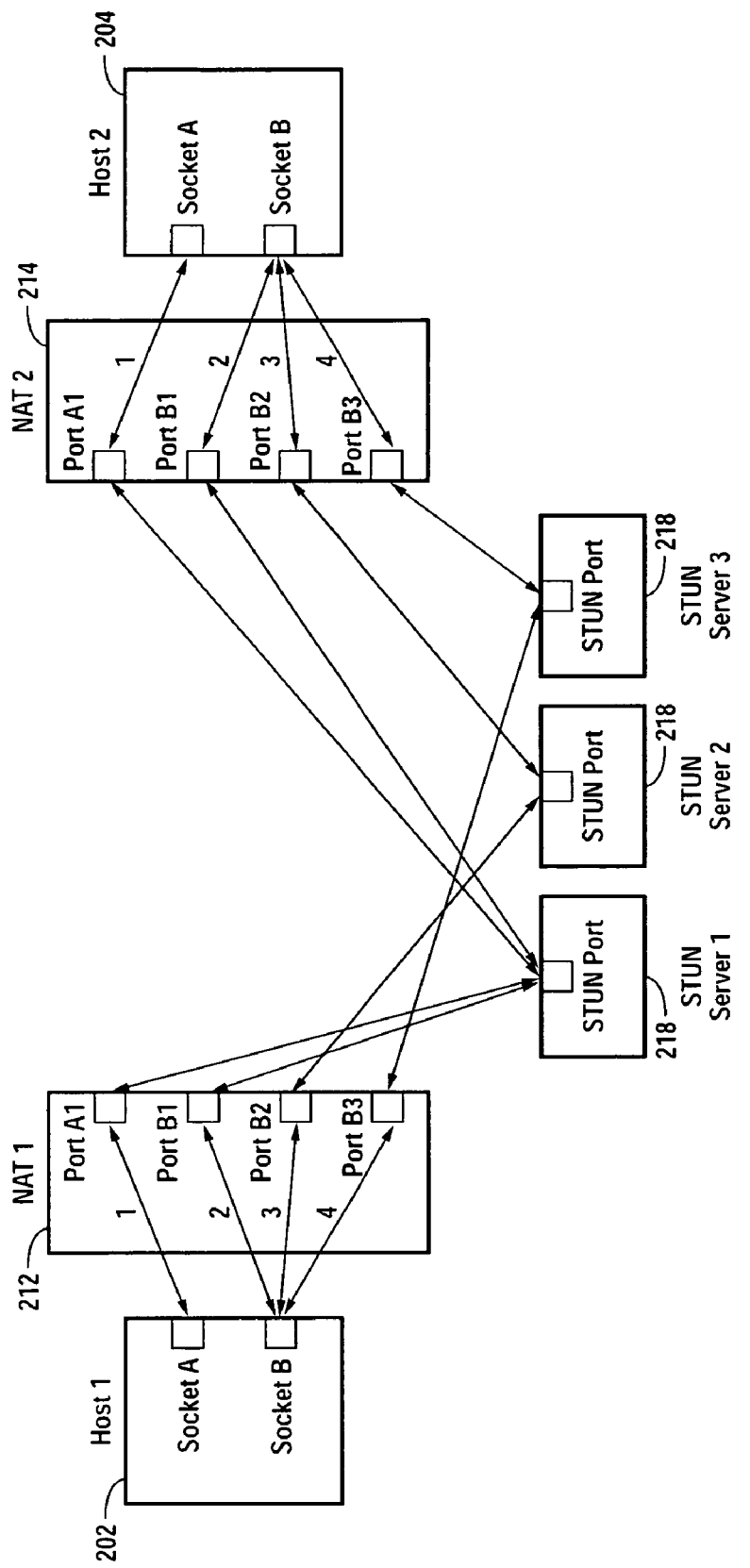
FIG. 2 is a schematic diagram showing an example of how two hosts trying to open a peer-to-peer channel with each other interact with the STUN servers according to an embodiment of the present invention.

FIG. 2 shows an example of how two hosts 202, 204 with respective NATs 212, 214 trying to open a peer-to-peer channel with each other interact with the STUN servers 218 and find out about their respective NATs' information before attempting a connection using random ports. Each host 202, 204 creates two sockets (socket A and socket B) that are bound to two random ports. A first STUN packet is sent out through socket A of each host 202, 204 to STUN server 1. This will create port A1 on each NAT 212, 214. Then three STUN packets are sent through socket B of each host 202, 204 to STUN server 1, 2 and 3. If the NAT is a cone, then port B1=port B2=port B3. If the NAT is symmetric, then port B1, B2, and B3 will differ by the increment that the NAT is using. As a result, the host will have information on the public port number associated with each of these packets that were sent out (public ports A1, B1, B2 and B3). This information enables one to calculate the predicted public port number that will be assigned when the local host tries to directly send a packet to the remote host using that same socket B. Especially, in case of a cone NAT, the predicted port will be B3. For a symmetric NAT, the predicted port will be B3+increment.

For multiple peer-to-peer connections, every connection may be treated as a separate one. For every new connection, the host will bind a new socket to a random port. Therefore, if the local host needs to connect to three other remote hosts, for example, the local host will create a unique socket for each of those other hosts. When sending data to all those hosts, the local host will send it through all three sockets.

When the host uses a single (private) port, however, the port prediction needs to be changed. Using a single port means that, for every new connection, one will reuse socket B that is bound to that single port.

Figure 3:
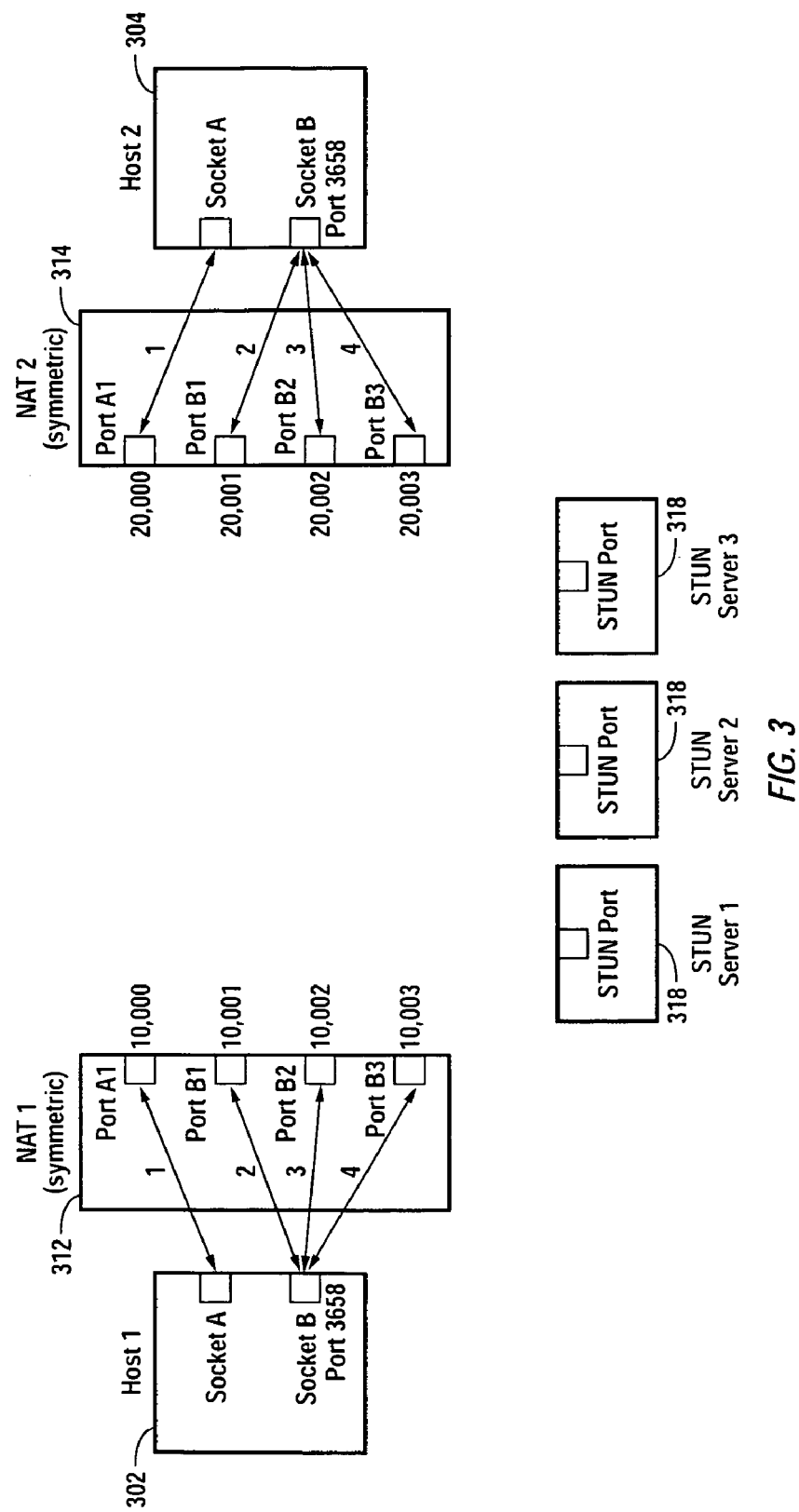
FIGS. 3 and 4 are schematic diagrams showing what happens when host 1 first connects to host 2, and then to host 3 in a situation where all hosts are behind a symmetric NAT, according to another embodiment of the present invention.
Figure 4:
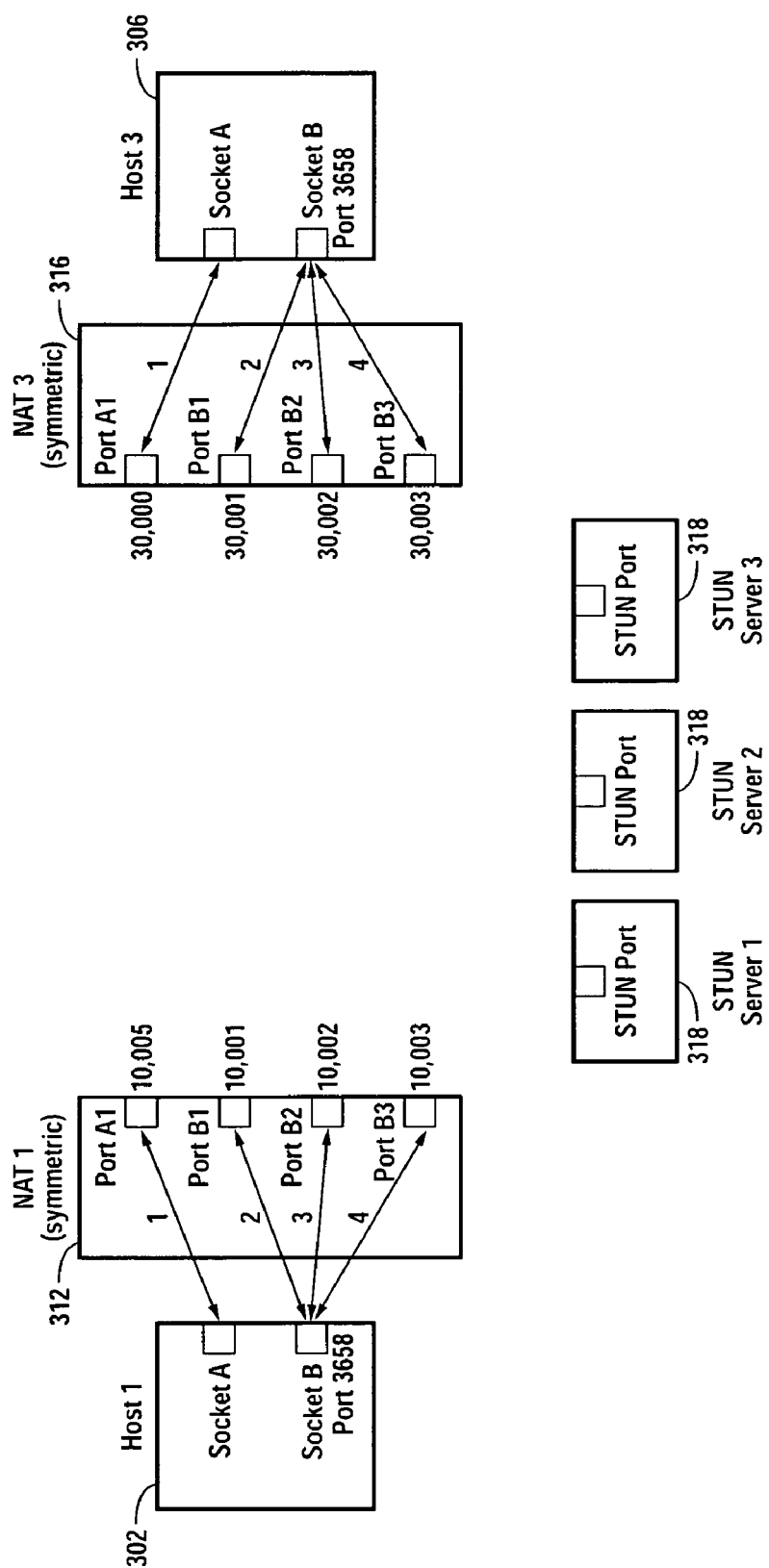

FIGS. 3 and 4 show what happens when host 1 (302) first connects to host 2 (304), and then to host 3 (306) in a situation where all hosts are each behind a symmetric NAT (312, 314, 316, respectively). It is assumed that socket B is always bound to the single port 3658 on the local host, and the first port to be opened on the NAT for each outgoing connection is 10,000 for host 1, 20,000 for host 2 and 30,000 for host 3. It is further assumed that the increment on all NATs is 1.

In FIG. 3 when doing the STUN requests with the STUN servers 318 on host 1 and host 2, the predicted port is calculated in the same manner as with random ports, because the NAT has not yet opened any ports for either socket A or B. On host 1, the predicted port number will be port B3+1=10,004. And on host 2 it will also be B3+1=20,004.

Let's suppose the connection between host 1 (302) and host 2 (304) was successful. The next step is to connect host 1 (302) to host 3 (306), as seen in FIG. 4. At this point, host 1 restarts to communicate with the STUN servers 318 by binding socket A to a random port number, and by re-using our socket B that is bound to port 3658. On the NAT 312, there will be a new port number opened for socket A. In this case, it will be port number 10,005. Furthermore, if this second connection is attempted shortly after the first one, the NAT 312 will not create new ports for socket B because the previously created ones will not have timed out yet. Instead it will re-use the existing ones from the previous connection, namely port B1=10,001, B2=10,002 and B3=10,003. Thus, instead of the predicted port being B3+1, it gets calculated as follows: predicted port=max(A1, B3)+1. This way the predicted port will be A1 (10,005)+1=10,006, which is correct. This formula only applies to symmetric NATs. For cone NATs the predicted port is always equal to B3.

If this second connection is attempted not immediately after the first connection, then there is a possibility that the ports assigned to B1, B2 and B3 in the NAT 312 have expired. Typically ports expire after 2 to 30 minutes of network inactivity. In that case, the max(A1, B3) will be B3 and the port prediction will be done correctly as well (i.e., B1=10,006; B3=10,008; B3+1=10,009).

Figure 5:
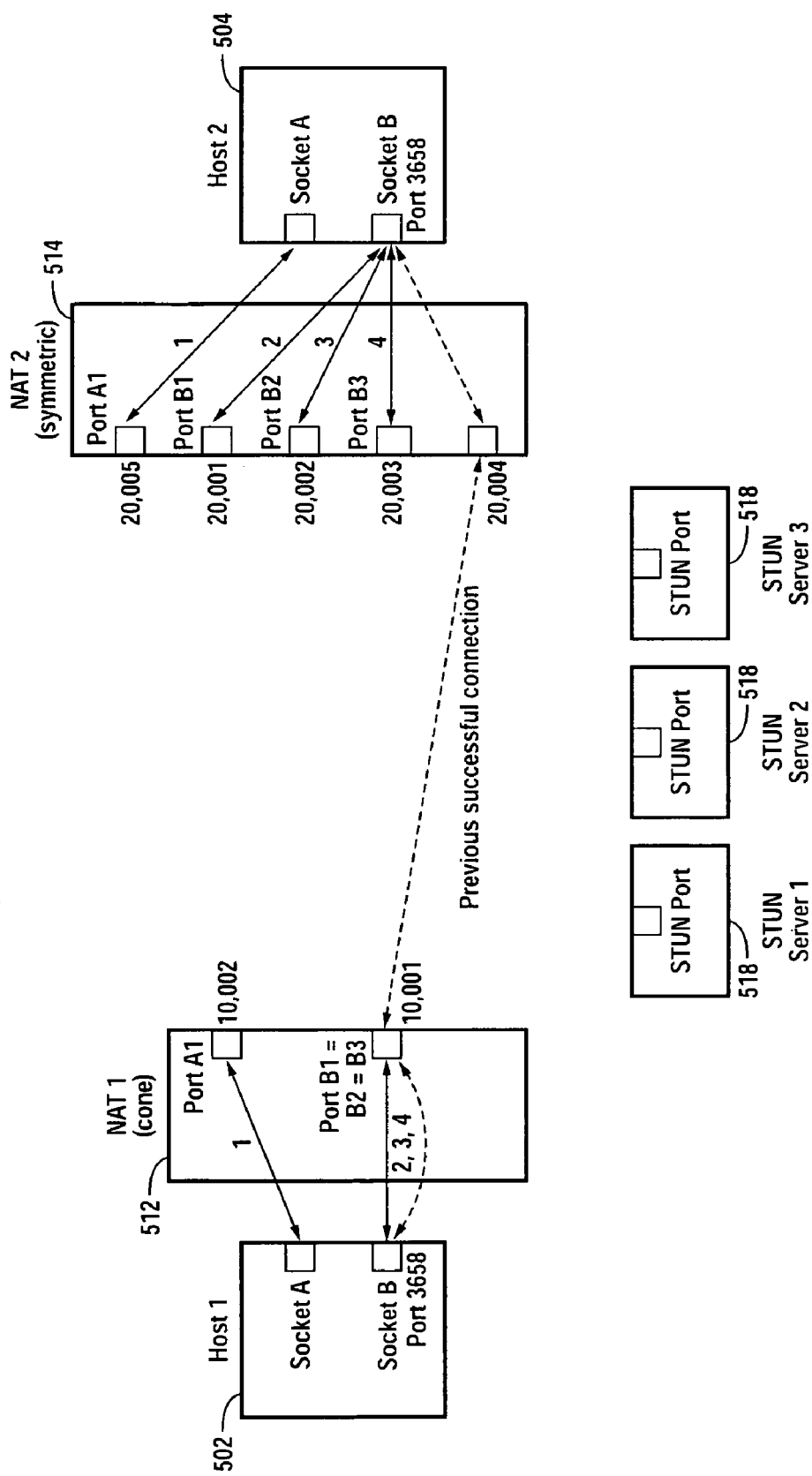
FIGS. 5 and 6 are schematic diagrams showing what happens when host 1 first connects to host 2, and then host 2 exits and reenters while the port for host 2 is still alive, according to another embodiment of the present invention.
Figure 6:
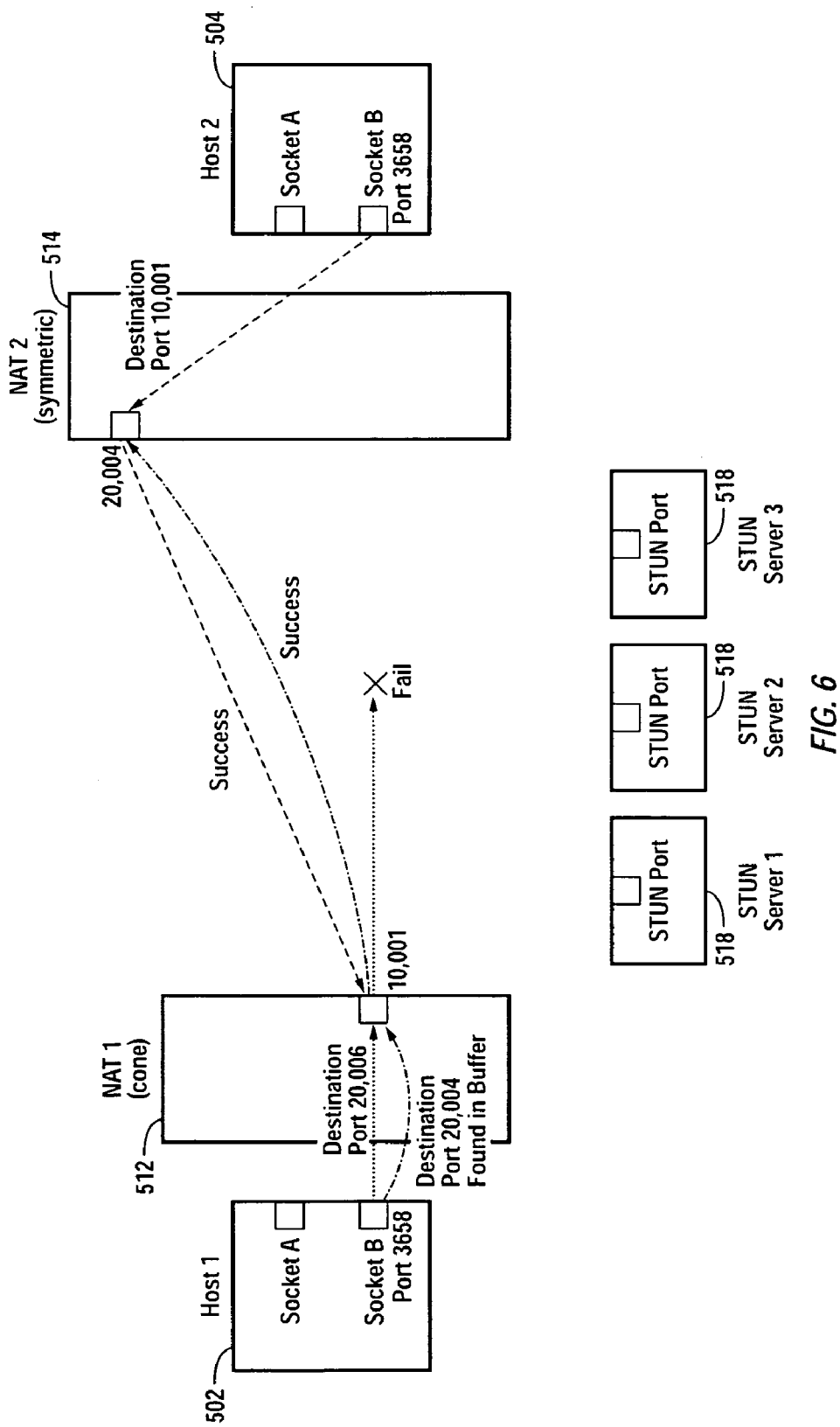

A slight problem arises because of this way of doing port prediction, as shown in FIGS. 5 and 6. Let's suppose that host 1 (502) is in a game lobby, waiting for other players to join. As soon as host 2 (504) joins, a peer-to-peer connection is attempted, for instance, to enable both hosts to talk to each other with a headset and voice over IP. So far there is no problem, and the port predictions and therefore the connection should be successful. Now let's suppose that after successfully connecting to each other, host 2 exits the game lobby and re-enters shortly after. A new connection attempt needs to be made.

Let's define host 1 (502) to be behind the cone NAT 512, and host 2 (504) behind the symmetric NAT 514. A plurality of STUN servers 518 are provided for accepting STUN requests from the hosts. Let's suppose the successful connection was made through port 10,001 on the cone NAT 512, and 20,004 on the symmetric NAT 514. On the second connection attempt, the predicted port for the cone NAT 512 will still be 10,001. The predicted port for the symmetric NAT 514, however, will be 20,006 (FIG. 5).

Now when host 2 behind the symmetric NAT 514 is going to send out a UDP (User Datagram Protocol) packet directly to host 1 to attempt the connection, the packet will go through port 20,004 on the symmetric NAT since that port is still active in the NAT 514 from the previous connection to the same IP/port for host 1. This means that the predicted port 20,006 is wrong, and the UDP packet sent to that port from host 1 will fail (FIG. 6).

Luckily the packet sent from host 2 should arrive to host 1, whether the cone NAT for host 1 is port-restrictive or not. Because the predicted port for the cone NAT 512 is still 10,001, it means that it has not timed out yet. Therefore the NAT 512 will remember that a packet was previously sent to the symmetric NAT's IP on port 20,004 and therefore it will let the packet from host 2 come in.

However, because the predicted port for the symmetric NAT 514 is definitely going to be wrong, the probability of connection success is not as high as it can be. For example, if the UDP packet sent from host 2 to host 1 is lost, then because the UDP packet sent from host 1 to host 2 will definitely not make it either, the connection fails.

To get both port predictions right and keep the connection success probability as high as possible, there needs to be a special process put in place. In case the local host is behind a cone NAT 512, and the remote host is behind a symmetric NAT 514, the local host is going to keep a history of previous successful connections. This is done in the form of a local buffer that contains the IP address and port to be written to for any previous successful connection. Every time such a connection is successful, a new entry is added to the buffer. When the buffer is full, it wraps around so that new entries start being saved from the beginning of the buffer again.

Every time the local host behind a cone NAT 512 attempts to connect to a remote host behind a symmetric NAT 514, it checks if there was a previous successful connection to that remote host based on its public IP address by going through the buffer. If an instance is found in the buffer, then the local host sends a UDP packet with the corresponding port number found in the buffer.

Since the port of a successful previous connection may have timed out in the remote host's NAT 514, the local host also always sends another UDP packet to the predicted port number. Therefore, in the case where there is a history of a previous connection to the remote host, two UDP packets get sent out to the same IP address but with two different port numbers (FIG. 6). In this particular case, there is no problem in doing so, because both these packets would go out through the same port number on the NAT 512. It would not be possible, however, to use this same technique from a host that is behind a symmetric NAT with port-sensitive allocation, because by sending out 2 UDP packets to 2 different port numbers, the port-sensitive NAT would create 2 new port entries. By creating those 2 port entries its port number would increase twice and would therefore reduce the chance that the previously calculated predicted port to be used by the remote host will be correct.

If only one of the 2 NATs timed out between re-attempting a connection between 2 clients with a previous successful connection, then the port prediction will be correct on both sides.

For many games it is important that the peer-to-peer connection attempt be done in a separate thread. In that way, if, for example, a host joins a lobby where two other hosts are already interconnected and talking to each other by exchanging voice data, their communication will not be cut off because of having to attempt a connection with the new host at the same time.

In addition, while an application attempts the connections that may take up to several seconds, it may want to display moving menus instead of freezing menus.

An application should have a way to find out that a new client arrived and needs to be connected thereto. Once a host receives the instruction to do a STUN request, it launches that in a separate thread. That way the main loop of the application can keep receiving other data and does not have to wait for an answer of the STUN servers.

When the local host has received the remote host's information and is ready to try to connect, the connection process is also launched in a separate thread since it could take quite some time for it to complete.

In those 2 separate threads, the application will need to look for incoming STUN packets and incoming connection packets on the single port. However since this is done in a separate thread, it is not possible to look at the queue and empty it because there may be other data packets coming in while waiting for a response from a STUN server, for example.

The adopted solution here is to only look for incoming packets on the single port in one place, namely inside the main application loop. The application is then responsible for checking whether the incoming packet contains application-specific data, whether it is a STUN packet, connection packet, or unwanted data.

If it is a STUN packet or a connection packet, the application takes the packet out of the queue and places it in shared buffers. That way the main queue gets emptied so the application can keep receiving new data.

When the separate threads for the STUN request and the connection establishment take over, they keep checking their respective shared buffers. If there is nothing there, they keep waiting. If there is something there, they take the data out of the buffer and treat it as if they had just received a packet. Then they empty the buffer to make space for new packets to be put therein.

Figure 7:
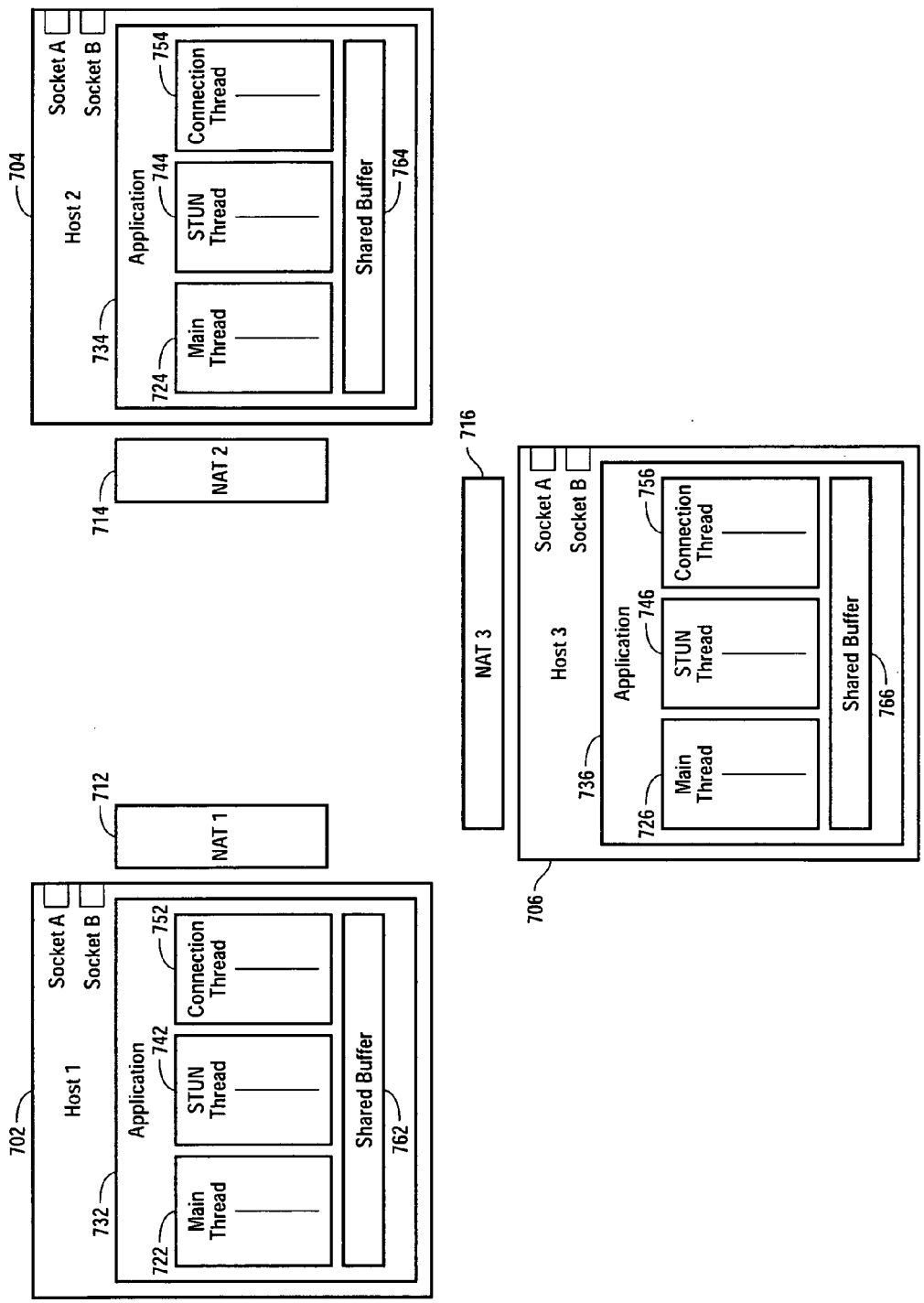
FIG. 7 is a simplified schematic diagram of a main loop of an application illustrating an attempted connection with an additional host according to another embodiment of the present invention.

FIG. 7 shows host 1 (702) and host 2 (704), which are connected in a main loop via their main threads 722, 724 in their applications 732, 734 via NAT 1 (712) and NAT 2 (714), respectively. A connection is attempted between host 3 (706) via NAT 3 (716) and host 1 (702) via NAT 1 (712) along their separate STUN threads 746, 742 for STUN requests and connection threads 756, 752 for connection requests. Each application (732, 734, 736) has a shared buffer (762, 764, 766) for the main thread (722, 724, 726) to store STUN packets and connection packets. The STUN thread (742, 744, 746) and connection thread (752, 754, 756) check for packets in the shared buffer (762, 764, 766) instead of the operating system's network queue.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of providing peer-to-peer connection among a plurality of host devices disposed behind corresponding network address translators, the method comprising:
   providing a plurality of STUN servers;
   for each host device to be connected, providing a first socket bound to a first private port and a second socket bound to a second private port;
   for each host device to be connected, sending a first STUN packet through the first socket to a first STUN server of the plurality of STUN servers via a public port of the corresponding network address translator, the public port having a public port number identified by the first STUN server;
   for each host device to be connected, sending a second group of STUN packets through the second socket to the plurality of STUN servers via one or more public ports of the corresponding network address translator, the second group of STUN packets being equal in number to the STUN servers, the one or more public ports being different from the public port for the first socket, each of the one or more public ports having a public port number identified by the STUN servers; and
   for each host device to be connected, calculating a predicted public port number of the corresponding network address translator for the second socket, based on the public port numbers of the public ports for the first socket and the second socket, the predicted public port number to be used for peer-to-peer connection between the second socket of the host device and other host devices.

2. The method of claim 1 wherein the predicted public port number of the corresponding network address translator for the second socket of the host device is a maximum of ((the port number of the public port for the first socket+an increment) and (the port number of the last public port which is the highest port number for the second socket+an increment)).

3. The method of claim 2 wherein different public port numbers of the corresponding network address translator are separated by a uniform increment.

4. The method of claim 2 wherein the predicted public port number of the corresponding network address translator for the second socket of the host device is (the port number of the public port for the first socket+the increment), if there has been a previous peer-to-peer connection for the second socket of the host device via the one or more public ports of the corresponding network address translator and the one or more public ports are still active.

5. The method of claim 2 wherein the predicted public port number of the corresponding network address translator for the second socket of the host device is (the port number of the last public port which is the highest port number for the second socket+the increment), if either there has not been a previous peer-to-peer connection for the second socket of the host device via the one or more public ports of the corresponding network address translator, or there has been a previous peer-to-peer connection for the second socket of the host device via the one or more public ports of the corresponding network address translator and the peer-to-peer connection has expired and the one or more public ports are no longer active.

6. The method of claim 1 further comprising:
   forming a peer-to-peer connection between the second socket of a first host device and the second socket of a second host device using the predicted public port number of the corresponding network address translator for each of the second socket of the first host device and the second socket of the second host device; and forming a peer-to-peer connection between the second socket of the first host device and the second socket of a third host device using the predicted public port number of the corresponding network address translator for the second socket of the third host device and an updated public port number of the corresponding network address translator for the second socket of the first host device;

wherein the updated public port number of the corresponding network address translator for the first host device is obtained by repeating the steps of sending a first STUN packet, sending a second group of STUN packets, and calculating the predicted public port number as the updated public port number of the corresponding network address translator for the second socket of the first host device to be connected to the second socket of the third host device.

7. The method of claim 1 further comprising:

sending a packet from the second socket of a first host device to the second socket of a second host device using the predicted public port number of the corresponding network address translator for each of the second socket of the first host device and the second socket of the second host device.

8. The method of claim 7 wherein the corresponding network address translator of the first host device is a cone network address translator and the corresponding network address translator of the second host device is a symmetric network address translator, and further comprising:

if there is a previous successful connection between the second socket of the first host device and the second socket of the second host device via a previous public port number of the corresponding network address locator of the second host device, sending a duplicate of the packet from the second socket of the first host device to the second socket of the second host device via the previous public port number of the corresponding network address locator of the second host device.

9. The method of claim 1 further comprising storing, by a first host device in a buffer, information of public port number of a corresponding network address locator of another host device if there is a previous successful connection between the second socket of the first host device and the second socket of the other host device.

10. The method of claim 1 further comprising:

forming a peer-to-peer connection between the second socket of a first host device and the second socket of a second host device using the predicted public port number of the corresponding network address translator for each of the second socket of the first host device and the second socket of the second host device, the first host device and the second host device communicating in a main loop of an application; and forming a peer-to-peer connection between the second socket of the first host device and the second socket of a third host device using a separate thread from the main loop of the application to transfer STUN packets with the STUN servers and to transfer connection packets with the third host device.

11. The method of claim 10 further comprising:

checking incoming packets on the second socket of the first host device in the main loop of the application to determine whether the incoming packet is a STUN packet, a connection packet, or other data; and if the incoming packet is a STUN packet or a connection packet, moving the incoming packet to a shared buffer to be shared with the separate thread used for forming the peer-to-peer connection between the second socket of the first host device and the second socket of the third host device.

12. A system of providing peer-to-peer connection among a plurality of host devices, the system comprising:

a plurality of host devices disposed behind corresponding network address translators; and a plurality of STUN servers;

wherein each host device includes a first socket bound to a first private port and a second socket bound to a second private port;

wherein each host device is configured to send a first STUN packet through the first socket to a first STUN server of the plurality of STUN servers via a public port of the corresponding network address translator, the public port having a public port number identified by the first STUN server;

wherein each host device is configured to send a second group of STUN packets through the second socket to the plurality of STUN servers via one or more public ports of the corresponding network address translator, the second group of STUN packets being equal in number to the STUN servers, the one or more public ports being different from the public port for the first socket, each of the one or more public ports having a public port number identified by the STUN servers; and wherein each host device is configured to calculate a predicted public port number of the corresponding network address translator for the second socket, based on the public port numbers of the public ports for the first socket and the second socket, the predicted public port number to be used for peer-to-peer connection between the second socket of the host device and other host devices.

13. The system of claim 12 wherein the predicted public port number of the corresponding network address translator for the second socket of the host device is a maximum of ((the port number of the public port for the first socket+an increment) and (the port number of the last public port which is the highest port number for the second socket+an increment)).

14. The system of claim 13 wherein different public port numbers of the corresponding network address translator are separated by a uniform increment.

15. The system of claim 13 wherein the predicted public port number of the corresponding network address translator for the second socket of the host device is (the port number of the public port for the first socket+the increment), if there has been a previous peer-to-peer connection for the second socket of the host device via the one or more public ports of the corresponding network address translator and the one or more public ports are still active.

16. The system of claim 13 wherein the predicted public port number of the corresponding network address translator for the second socket of the host device is (the port number of the last public port which is the highest port number for the second socket+the increment), if either there has not been a previous peer-to-peer connection for the second socket of the host device via the one or more public ports of the corresponding network address translator, or there has been a previous peer-to-peer connection for the second socket of the host device via the one or more public ports of the corresponding network address translator and the peer-to-peer connection has expired and the one or more public ports are no longer active.

17. The system of claim 12,
wherein a peer-to-peer connection is formed between the second socket of a first host device and the second socket of a second host device using the predicted public port number of the corresponding network address translator for each of the second socket of the first host device and the second socket of the second host device;
wherein a peer-to-peer connection is formed between the second socket of the first host device and the second socket of a third host device using the predicted public port number of the corresponding network address translator for the second socket of the third host device and an updated public port number of the corresponding network address translator for the second socket of the first host device; and
wherein the updated public port number of the corresponding network address translator for the first host device is obtained by resending a first STUN packet through the first socket to a first STUN server of the plurality of STUN servers via a public port of the corresponding network address translator, the public port having a public port number identified by the first STUN server; resending a second group of STUN packets through the second socket to the plurality of STUN servers via one or more public ports of the corresponding network address translator, the second group of STUN packets being equal in number to the STUN servers, the one or more public ports being different from the public port for the first socket, each of the one or more public ports having a public port number identified by the STUN servers; and calculating the updated public port number of the corresponding network address translator for the second socket, based on the public port numbers of the public ports for the first socket and the second socket.

18. The system of claim 12 wherein a first host device is configured to send a packet from the second socket thereof to the second socket of a second host device using the predicted public port number of the corresponding network address translator for each of the second socket of the first host device and the second socket of the second host device.

19. The system of claim 18,
wherein the corresponding network address translator of the first host device is a cone network address translator and the corresponding network address translator of the second host device is a symmetric network address translator; and
wherein, if there is a previous successful connection between the second socket of the first host device and the second socket of the second host device via a previous public port number of the corresponding network address locator of the second host device, the first host device is configured to send a duplicate of the packet from the second socket of the first host device to the second socket of the second host device via the previous public port number of the corresponding network address locator of the second host device.

20. The system of claim 12 wherein a first host device is configured to store in a buffer information of public port number of a corresponding network address locator of a second host device if there is a previous successful connection between the second socket of the first host device and the second socket of the second host device, and wherein the corresponding network address translator of the first host device is a cone network address translator and the corresponding network address translator of the second host device is a symmetric network address translator.

21. The system of claim 12, further comprising an application,
wherein a peer-to-peer connection is formed between the second socket of a first host device and the second socket of a second host device using the predicted public port number of the corresponding network address translator for each of the second socket of the first host device and the second socket of the second host device, the first host device and the second host device communicating in a main loop of the application; and
wherein a peer-to-peer connection is formed between the second socket of the first host device and the second socket of a third host device using a separate thread from the main loop of the application to transfer STUN packets with the STUN servers and to transfer connection packets with the third host device.

22. The system of claim 21,
wherein the application is configured to check incoming packets on the second socket of the first host device in the main loop of the application to determine whether the incoming packet is a STUN packet, a connection packet, or other data; and
wherein, if the incoming packet is a STUN packet or a connection packet, the application is configured to move the incoming packet to a shared buffer to be shared with the separate thread used for forming the peer-to-peer connection between the second socket of the first host device and the second socket of the third host device.

* * * * *